United States Patent
Carson et al.

(10) Patent No.: US 6,768,709 B2
(45) Date of Patent: Jul. 27, 2004

(54) HIDING DIGITAL DATA IN A DIGITAL AUDIO OR VIDEO CARRIER SIGNAL

(75) Inventors: Douglas M. Carson, Cushing, OK (US); Henry B. Kelly, Stillwater, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 631 days.

(21) Appl. No.: 09/792,163

(22) Filed: Feb. 23, 2001

(65) Prior Publication Data

US 2001/0024420 A1 Sep. 27, 2001

Related U.S. Application Data

(60) Provisional application No. 60/184,232, filed on Feb. 23, 2000.

(51) Int. Cl.[7] .................................................. G11B 7/00
(52) U.S. Cl. ................................. 369/53.21; 369/275.3
(58) Field of Search ........................... 369/53.21, 59.12, 369/59.13, 30.27, 30.04, 47.48, 47.49, 47.45, 275.3, 275.1, 59.19, 47.19, 59.27; 386/94, 125

(56) References Cited

U.S. PATENT DOCUMENTS

| | | | |
|---|---|---|---|
| 4,228,326 A | | 10/1980 | Dakin et al. |
| 6,157,330 A | | 12/2000 | Bruekers et al. |
| 6,469,969 B2 | * | 10/2002 | Carson et al. ............ 369/59.12 |
| 6,477,124 B2 | * | 11/2002 | Carson ..................... 369/53.21 |
| 6,487,155 B1 | * | 11/2002 | Carson et al. ............ 369/59.13 |
| 6,636,689 B1 | * | 10/2003 | Stebbings ..................... 386/94 |
| 6,646,967 B1 | * | 11/2003 | Garcia ..................... 369/53.21 |

FOREIGN PATENT DOCUMENTS

WO   WO 98/54713   12/1998

* cited by examiner

Primary Examiner—Ali Neyzari
(74) Attorney, Agent, or Firm—Fellers, Snider, et al.

(57) ABSTRACT

An optical disc in which hidden data are stored for forensic tracking or copy protection purposes. This disc includes a contiguous user data portion comprising a set of user data samples which, when accessed by a readback system, generates a human detectable output. The disc further includes a null zone adjacent the contiguous user data portion comprising a sequence of user data fields storing a set of user data samples which, when accessed by a readback system, generates an output with a specified signal to noise ratio so as to be substantially undetectable by a human, wherein hidden data are written to at least selected ones of the user data fields of the null zone to convey a specified informational message related to the optical disc, the specified informational message undetectable by a human when the null zone is accessed by the readback system.

8 Claims, 5 Drawing Sheets

HIDING DIGITAL DATA IN A DIGITAL AUDIO OR VIDEO CARRIER SIGNAL

RELATED APPLICATIONS

This application claims priority to U.S. Provisional Application No. 60/184,232 filed Feb. 23, 2000.

FIELD OF THE INVENTION

The present invention relates generally to the field of digital data and more particularly, but without limitation, to the encoding of hidden data onto a digital audio or video carrier signal, written to a recording medium, such as an optical disc.

BACKGROUND OF THE INVENTION

Optical discs have become increasingly popular as an efficient and cost-effective storage medium for digitally stored data. A typical optical disc comprises a circular disc having a recording layer of light reflective material embedded in a refractive substrate. The recording layer is disposed along a plane substantially normal to an axis about which the disc is rotated and stores data in the form of localized pits and lands (also sometimes referred to as "marks" and "spaces") along a continuously extending spiral track. The length of each pit and land corresponds to one of a selected number of data symbols (for example 3T to 11T, with T of a determined length.)

The data symbols are recovered from the disc through the use of a light source (such as a laser) which applies light of a selected wavelength to the rotating disc and a transducer which generates a readback signal indicative of the data in relation to the relative differences in reflectivity of the pits and lands. It is common to separate the relative elevations of the pits and the lands by a distance equal to a quarter wavelength of the applied light so as to facilitate a substantial change in the amount of light reflected by the pits as compared to the amount of light reflected by the lands.

One popular optical disc format is commonly referred to as a compact disc, or CD, which has found widespread use in recent years in computer applications (such as CD-ROM) and in the music recording industry (audio CDs). A CD has an outer diameter of 120 millimeters (4.724 inches) and a data storage capacity of about 650 megabytes (MB).

Another popular optical disc format is commonly referred to as digital versatile disc, or DVD. A DVD can be considered a "high-density" CD, in that a typical DVD has generally the same dimensions as a CD, but can store about 4.7 gigabytes (GB) of data per recording layer, due to increased data storage densities through reductions in pit/land geometry and improvement in data encoding and recovery techniques. Other optical discs configurations with respective form factors and data storage capacities have been proposed and commercialized.

Due to worldwide consumer demand for the types of information available on optical discs (e.g. software, video, music, etc.), combined with the relative ease with which unauthorized copies of optical discs can be generated, suppliers of optical discs have attempted to implement various copy protection schemes to restrict unauthorized replication of the discs. One type of copy protection involves configuring an optical disc in such a manner that an authorized copy functions properly in a readback system, but an unauthorized copy is prevented from doing so. Another type of copy protection provides for the placement of forensic tracking information on the disc, with this information relating to the source of the disc, the mastering data and so on. Forensic tracking generally does not prevent an unauthorized copy from functioning in a readback system, but based on the presence or absence of the information, a determination can be made whether a particular optical disc is in fact an authorized copy.

Since optical discs are portable record carriers designed to be played in any number of commercially available playback systems, the data on an optical disc are organized in accordance with predefined industry standards to allow the playback systems to function as intended to retrieve the data stored on the disc. Such standards typically organize the data into a number of successive frames with control fields (subcode) for use by the readback system and user data fields for storing the actual user data (such as audio, video, software, etc.). Error correction codes (parity and/or Reed Solomon codes) are also used to provide on-the-fly error correction during readback.

A typical disc will further include so-called "null" or "silence" zones to separate other regions of the disc. Such silence zones are of relatively short duration and can be inserted between songs (tracks) on an audio disc and chapters on a video disc, as well as used as lead-in and lead-out zones to identify beginning and ending portions of the disc. Such silence zones may include user data fields, but do not include human audible information (in the case of an audio CD) or human visual visual (in the case of a video disc).

There is a need for improvements in the industry to place hidden data on a carrier signal without compromising the integrity of the signal itself, and it is to such improvements that the present invention is directed.

SUMMARY OF THE INVENTION

The present invention is directed the placement of a hidden message, comprising encoded hidden data, in a silence (null) zone of a digital audio or video carrier signal. The hidden data are encoded and substituted for a portion of the existing silence zone signal while maintaining the silence of the zone. Examples of such silence zones include lead-in zones (at the beginning of an optical disc), lead-out zones (at the end of an optical disc), at pause areas (typically 2–3 seconds in length) between adjacent audio selections on an audio disc, and at "black screen" areas between adjacent video selections on a video disc.

By encoding a hidden message in a location where the audio or video content is held below a specific level, the hidden data does not interfere with the normal transmission of the carrier signal and will have a sufficiently low signal to noise ratio to not be visually or audibly detected by an end user. In the preferred embodiment, the hidden data are represented as a binary sequence of a specified bit length, such as 16 bits. An encoding value of "1" is assigned a sample value such as "+1" and encoding value of "0" is assigned a sample value such as "−1". The hidden data are encoded by sequencing these two different symbols "−1,+1" to represent the encoded binary string.

Another aspect of the present invention is the transfer of the hidden data using a recording medium, such as an optical disc. The present invention provides for the mastering of an optical disc with the insertion of this hidden data. During the mastering process in which a glass master is produced, a portion of the silence zone data is extracted and the hidden message is written therein, prior to a signal processing unit receiving the input data. Furthermore, the present invention also provides for the extraction of the hidden data from a normal optical reading device. When the hidden data are extracted, a second output device processes the same output signal from a digital to analog converter which is provided to an output device, such as an audio speaker. Since the hidden message is silent, the hidden data may be detected, extracted and decoded without interfering with normal optical disc reading operations.

The placement of hidden data on an optical disc may serve many different purposes, such as the placement of forensic tracking information on the disc, encoding and writing ownership information into a silence zone. Another use of the hidden data may be for copy protection purposes in which authentication and verification of the disc is performed by a reading device with an internal microprocessor.

Other features of the present invention provide for a higher degree of accuracy in the detection and decoding of the hidden message. The hidden data may be written to a silence zone with a begin synchronization pattern and an end synchronization pattern. Therefore, a reading device monitoring the optical disc output for the hidden message, may only seek to detect the begin synchronization pattern and begin reading thereupon. Another feature of the present invention is encoding the hidden data at a variant frequency, such that the signal may be above or below the range of human detection.

DETAILED DESCRIPTION

Figure 1:
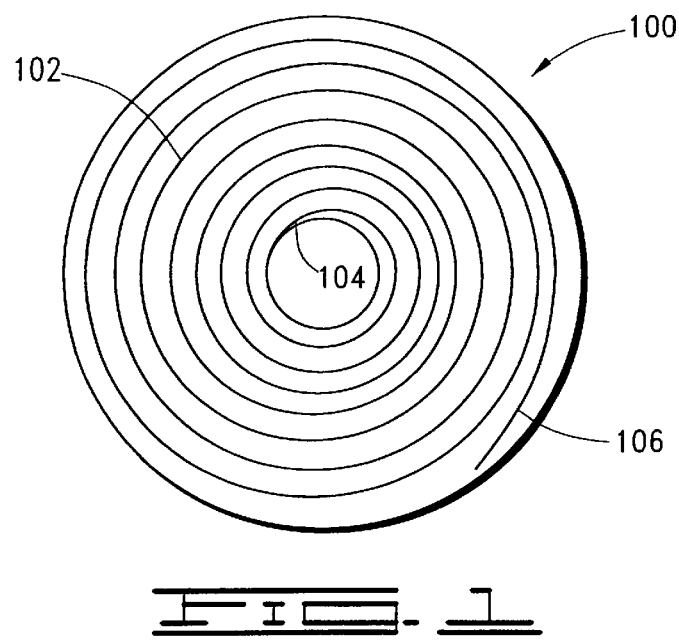
FIG. 1 is an optical disc having an exaggerated view of a continuous spirally extending data track.

FIG. 1 illustrates a typical optical disc 100 having a continuously extending spiral track 102 extending from a lead-in zone 104 to a lead-out zone 106. While it is contemplated that the present invention can be practiced with any of a variety of well known audio, video or computer disc configurations, for purposes of providing a concrete example, the optical disc 100 will be contemplated as comprising an audio CD.

Both the lead-in zone and the lead-out zone are "silence" zones, or "null" zones, where these zones are used primarily to orient and better facilitate the reading of the user data from the optical disc. Also on the optical disc 100, not visible, are inter-track silence zones between adjacent continguous user data portions (such as songs on the audio CD), with each such inter-track zone comprising a pause area of typically 2–3 seconds duration during which the output is "silent." It will be understood that these various silence zones are provided with user data fields, but the user data stored therein is configured to provide an output that is substantially undetectable by a human. Industry standards will typically specify a selected signal to noise ratio that should not be exceeded in such zones.

Figure 2:
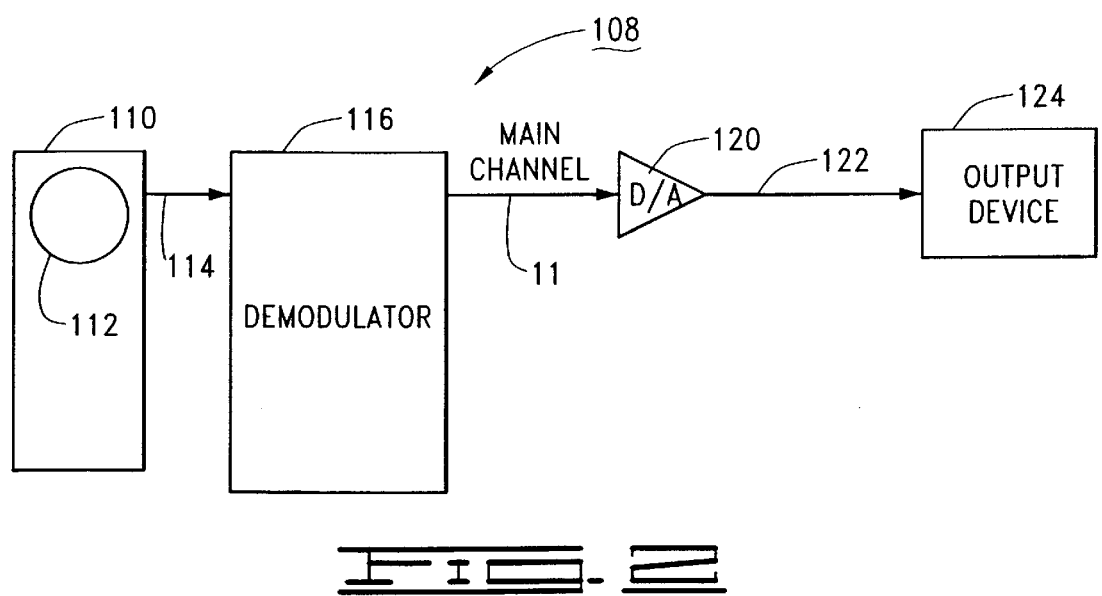
FIG. 2 is a typical optical disc reading system used to read the data from an optical disc.

The data encoded on a typical optical disc is read using a standard optical disc reading system, such as the system 108 of FIG. 2. A reading device 110 reads a disc 112 and produces a modulated signal from the optical refraction of the pits and lands from the disc itself. This modulated signal 114 is provided to a demodulator 116 which parses out the components of the modulated signal, specifically the main channel data, the error correction codes and the sub code bits. The error correction codes are used to help properly recreate the main channel data 118 which is fed, in digital format, to a digital to analog converter ("D/A") 120. The D/A converts this 44.1 kHz digital signal into the analog output signal 122 which is provided to an output source 124, such as an audio speaker or a video monitor.

Figure 3A:
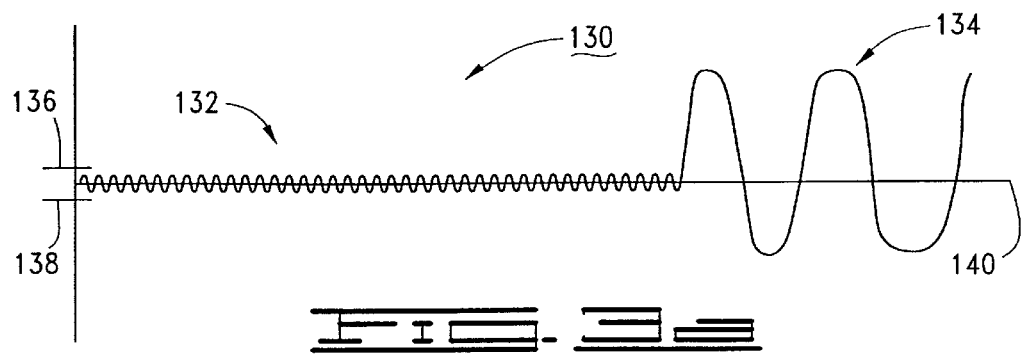
FIG. 3a illustrates an analog signal having a lead-in zone as a silence zone.

FIG. 3a provides an analog representation of a sample output signal from an optical disc reading device. The signal 130 has two separate zones, the first zone 132 is a silence zone, more specifically a lead-in zone and the second zone 134 is user data. The lead-in zone is shown with a specific dynamic range such that the signal is inaudible to an end user, within the dynamic range of the reading device. The lead-in zone is not meant to contain any detectable information, but rather only assist in the orientation of the reading device prior to the reading of the user data 134. Also illustrated in the lead-in zone is the low magnitude of this signal, essentially oscillating at a low magnitude value above 136 and below 138 a centerline 140.

Figure 3B:
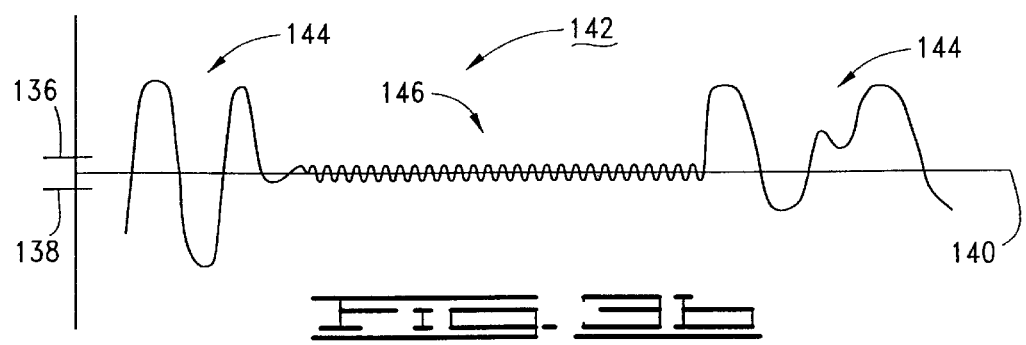
FIG. 3b illustrates an analog signal having an inter-track zone as the silence zone.

Similar to FIG. 3a, FIG. 3b also represents a silence zone analog signal with a user data signal. The signal 142 of FIG. 3b has a first user data zone 144, a silence zone 146 and a second user data zone 148. The silence zone 146 is an inter-track silence zone marking the area between different user data tracks, 144 and 148, on the disc. This zone, similar to the lead-in zone, is to be undetectable, so the signal has a low magnitude and oscillates between the values above 136 and below 138 the centerline 140.

Figure 3C:
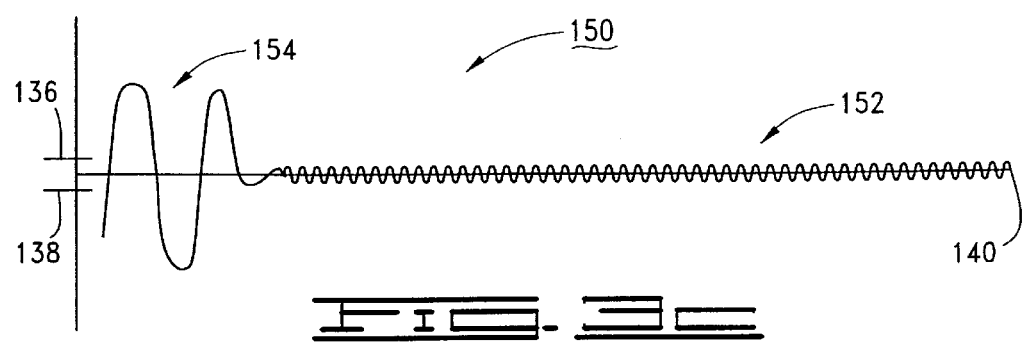
FIG. 3c illustrates an analog signal having a lead-out zone as the silence zone.

Also, FIG. 3c illustrates an analog signal 150 representing a lead-out zone 152 following a user data zone 154. This inaudible silence zone 152 is also shown oscillating at a small magnitude above 136 and below 138 the centerline 140. The lead-out zone is used to aid the reading device in completing the operations of reading the optical disc and to guide the completion of the reading process while maintaining a silent output signal.

Figure 4:
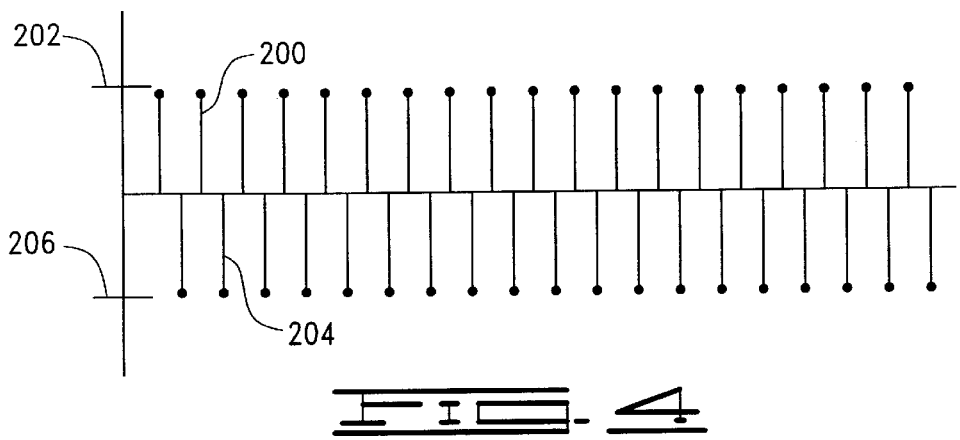
FIG. 4 illustrates a sample digital signal having a continuous toggle pattern at a pre-determined frequency.

FIG. 4 is an enlarged digital view of a typical silence zone signal. This signal is shown toggling between a first sample 200 having a first value 202, such as "+1", and a second sample 204 having a second value 206, such as "−1". The signal provides an oscillating pattern within the dynamic range of the reading device such that the signal has a low magnitude to remain inaudible to the end user. The present invention seeks to use this inaudible oscillation to embed a hidden message composed of encoded hidden data on the optical disc.

The hidden data set must first be encoded into a binary sequence and this sequence is then converted into representative toggling values prior to being written to the optical disc. In the preferred embodiment, the binary value of "0" is equivalent to the oscillation value of "−1" and the binary value of "1" is equivalent to the oscillation value of "+1". Using the above scheme, the binary value is then represented in this toggle pattern.

Figure 5:
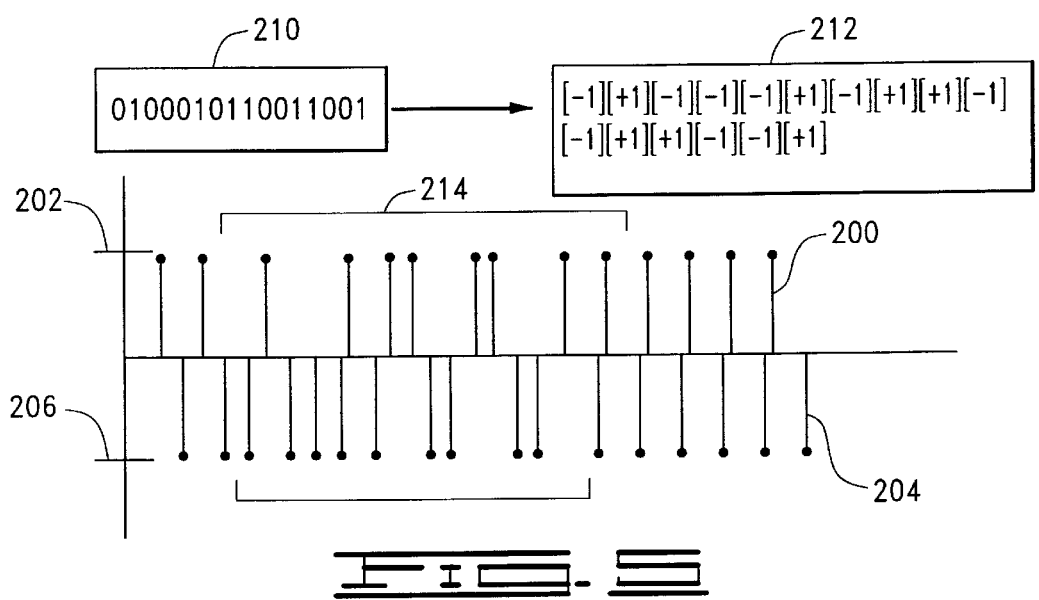
FIG. 5 illustrates a sample digital signal representing a hidden data sequence.

FIG. 5 illustrates this conversion where the initial box 210 shows a 16 bit binary value "0100010110011001". The second box 212 contains the converted binary pattern into its corresponding oscillation pattern, [−1][+1][−1][−1][−1][+1] [−1][+1][+1][−1][−1][+1][+1][−1][−1][+1].

Further illustrated in FIG. 5 is the digital representation of this encoded hidden data, the hidden message, where the data samples are written to either the first value, +1, or the second value, −1. The encoded oscillating signal is written such that the variant frequencies created by the oscillation pattern have a frequency within a specific dynamic range, remaining inaudible. Shown in FIG. 5 are the normal data samples 200 and 204, as shown in FIG. 4. These samples are illustrated having a high frequency with two samples per oscillation, this pattern is maintained until the data samples representing the hidden message are encountered, denoted under the bracket 214. After the hidden message data samples, the silence zone data sample oscillation is resumed. Therefore, within the silence zone data sample oscillation pattern, the encoded hidden data are written at the same inaudible magnitude.

Figure 6:
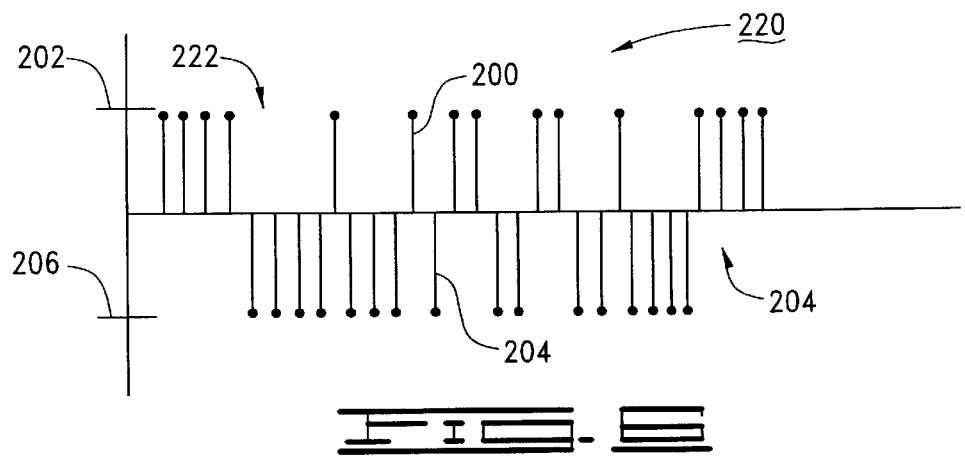
FIG. 6 illustrates a sample digital signal representing the hidden data sequence having a beginning and ending synchronization pattern.

In the preferred embodiment, a begin synchronization pattern and an end synchronization pattern are written with the hidden message. FIG. 6 illustrates the digital signal 220 of the preferred embodiment having the hidden message with the addition of the begin synchronization pattern 222 and the end synchronization pattern 224 encoded with the hidden message. The complete signal 220 is composed of a total of 32 samples, the first 8 samples represent the begin synchronization pattern 222 as having four first data samples 200 at a first value 202 followed by four second data samples 204 at a second value 206. The last 8 samples represent the end synchronization pattern 223 denoted by the first four data samples at the second value and the second four samples at the first value. The data of the hidden message of FIG. 6 is identical to FIG. 5, with the inclusion of these synchronization patterns.

The synchronization patterns, 222 and 224, assists in the reading of the hidden data by noting the beginning and ending locations of the hidden message. Similar to a bar code reading device, during the extraction of the hidden message, a reading device can simply look for the beginning synchronization pattern and begin reading the data thereupon. The synchronization patterns, 222 and 224, also insure the quality of the extracted hidden message by denoting the hidden message amongst the silence zone data samples.

Figure 7:
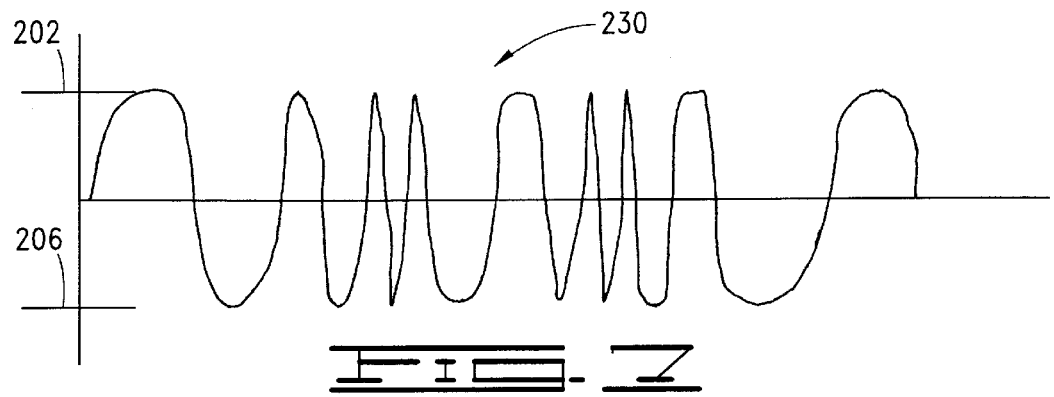
FIG. 7 illustrates the analog equivalent of the digital signal of FIG. 6.

The above discussion is focused on the digital representation of the hidden message. The present invention provides for the incorporation of the hidden data onto a carrier signal, whereupon the carrier signal is then used to produce an output signal. In the case of an audio CD, the output is an analog signal, therefore FIG. 7 illustrates the hidden message as an analog signal 230, having a magnitude range of "+1", 202 to "−1", 206, similar to the digital signal 220 of FIG. 6.

Figure 8:
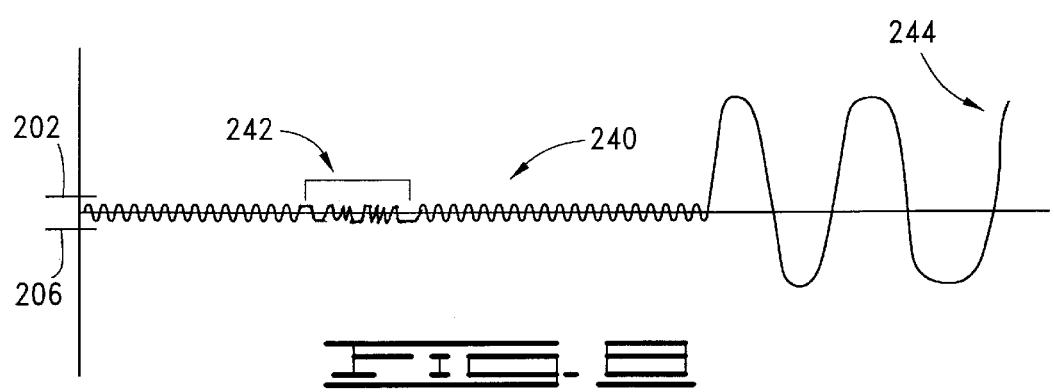
FIG. 8 illustrates the analog hidden data signal of FIG. 7 incorporated into a silence zone, where the silence zone is either a lead-in zone or an inter-track zone.

For illustration purposes, the signal 230 is shown enlarged with the accompanying begin synchronization pattern and end synchronization pattern. Relative to the silence zone data of FIGS. 3a, 3b and 3c, where the hidden message is written thereto, FIG. 8 illustrates the analog hidden data signal 230 as it is incorporated into a silence zone 240. This lead-in zone or inter-track zone, denoted at 240, oscillates at a magnitude range from a maximum value 202 to a minimum value 206 such that the signal will remain undetectable by the end user. The location of the hidden message does not interfere with the silence zone, and also does not affect the user data 242 portion of the signal.

Also within the scope of the present invention is the transference of the hidden data in a carrier signal. In the preferred embodiment, the hidden data are transferred using an optical disc having the user data written therein. Other embodiments for the transferring of the hidden data within digital data files, such as MPEG compression files, flash memory, or even transmission lines such as fiber optics, are within the scope of the placement of a hidden message in a carrier signal of the present invention.

Another aspect of the present invention is the adjustment of the frequency of the hidden message. FIG. 5 illustrates the signal having a high frequency. If the signal were written to an audio CD, the signal would have a maximum frequency of 22.05 kHz, as the signal is written to the disc at a frequency of 44.1 kHz. For a lower frequency, the number of user data samples representing a single data value would be adjusted accordingly. For instance, to reduce the frequency, the sample value [+1] may be represented by multiple individual samples having a common magnitude value, instead of the single sample illustrated in FIG. 5. Overall, the present invention provides for the placement of the hidden message to remain compliant with the magnitude requirements of the silence zone.

Figure 9:
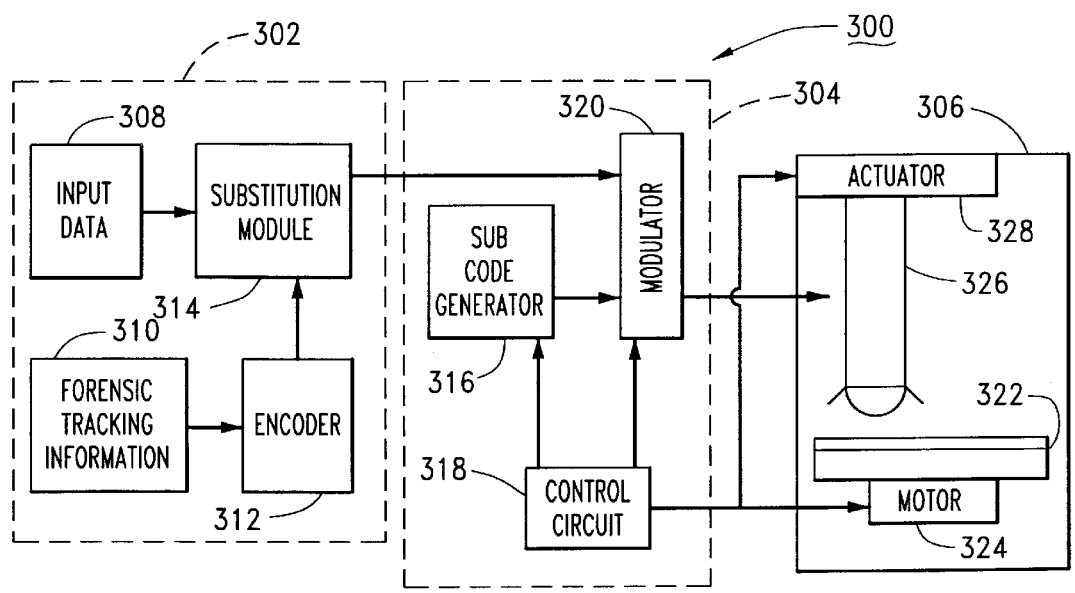
FIG. 9 is a disc mastering system where the hidden data are encoded and written to the silence zone prior to the mastering process.

FIG. 9 is a typical optical disc mastering system 300, with the inclusion of an input signal having the hidden message encoded therein. The system 300 is composed of an input source provider 302 which provides an input signal to a signal processing unit 304. The unit 304 then prepares the input signal and provides it to a laser beam recorder ("LBR") 306.

The input source provider 302 is composed of an input data module 308 having the user data in its original format, without the hidden data added therein. Also within the input source provider 302 is a hidden data module 310 containing the hidden data to be written to a silence zone of the disc. The hidden data module 310 provides the hidden data to an encoder 312, whereupon the hidden data are encoded into the hidden message. This message is then provided to a substitution module 314 which also receives the user data from the input data module 308.

The substitution module 314 monitors the input data source until a silence zone is found. At a silence zone, a module 314 removes the user data oscillation signal and writes the hidden data digital pattern therein. The substitution module then provides the user data signal and the hidden message to the signal processing unit 304.

The signal processing unit 304 is composed of three main components, a sub code generator 316, a control circuit 318 and a modulator 320. The modulator 320 directly receives the output signal from the substitution module 314 of the input source provider 302. The modulator also receives sub code generated by the sub code generator 316 to be combined with the user data to be encoded onto the optical disc. The modulator creates error correction codes, combines the error correction codes with the user data, and modulates the user data with error correction codes and sub code to produce an output signal, which is provided to the LBR 306.

The control circuit 318 of the signal processing unit 304 also provides an input source to the sub code generator 316 and the modulator 320. The control circuit 318 operates to effectively coordinate the data locations and the appropriate sub code bits for the proper encoded data in conjunction with the coordination of the LBR 306.

The LBR 306 is used to create a glass master 322 which is rotated by a motor 324. The glass master has the EFM signal encoded thereon by a laser 326 which is suspended over the glass master 322 where the position of the laser relative to the glass master 322 is controlled by an actuator system 328. The rotational speed of the motor 324, along with the movement of the laser 326 by the actuator 328, is controlled by the control circuit 318.

The modulator provides the modulated output signal to the laser 326, whereupon the laser is alternated in its ON or OFF state, thereby etching the user data in its modulated form onto the glass master. Once all the data have been written, the glass master is then used to replicate optical discs having the user data contained thereon. Since the present invention provides for the substitution of the hidden message into the user data input signal prior to the signal processing unit 304, the hidden message is modulated and written to the glass master without interfering with normal disc mastering operations. Thereupon, an optical disc containing the hidden message in a silence zone may be replicated using the glass master.

Another aspect of transferring the hidden message is the extraction of the encoded hidden data from the user data signal. A special reading device monitors the output signal of the reading device as a silence zone is read, watching for a begin synchronization pattern. Upon detection of this pattern is found, the reading device monitors the silence zone signal, detecting the oscillation sequence as it represents the encoded hidden data. The reading device continues this process until the end synchronization pattern is found.

Concurrently, the reading device monitoring the silence zone output decodes the hidden message using the same decoding pattern used to encode the hidden data. Every sample having a value of [+1] represents the binary value of "1" and every sample having a value of [−1] represents the binary value of "0". The binary representation of the hidden message is reconstructed from the silence zone output and the hidden data are decoded therefrom.

The hidden data are then provided to an output source. Should the hidden data contain forensic tracking information, the data may be provided to a video display or an audio speaker. In an embodiment where the hidden data are for copy protection purposes, the output of the hidden data decoding device may be provided to a microprocessing unit for authentication of the disc.

Figure 10:
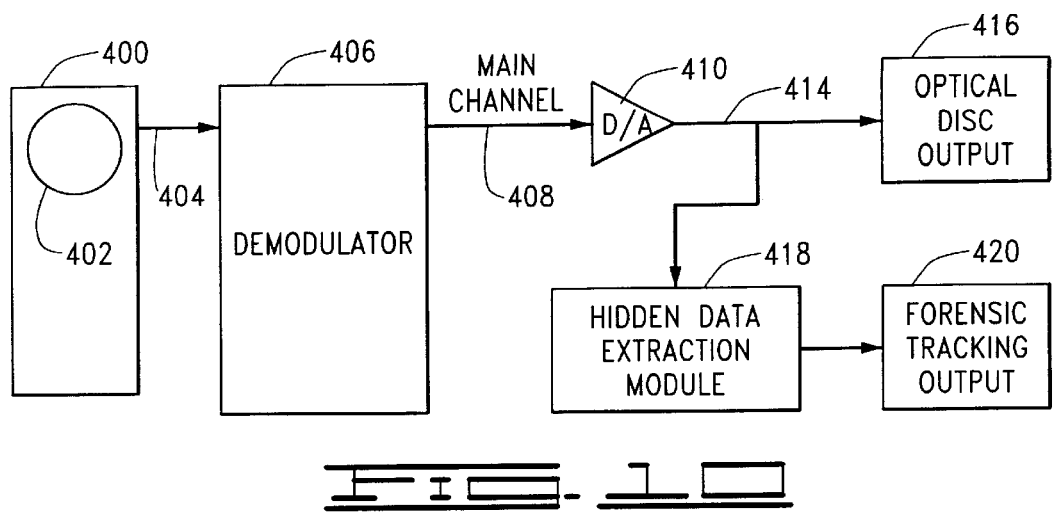
FIG. 10 is an optical disc reading system similar to FIG. 2 with the addition of a hidden data extraction module.

FIG. 10 illustrates a system that may be used to extract the hidden message from an optical disc. Similar to FIG. 2, a normal optical disc reading device may be used and the hidden message extracted from the output signal. FIG. 10 provides an optical disc reader 400 which reads an optical disc 402 having hidden data written to a silence zone in accordance with the present invention. The output of the reading device 400 is provided to a demodulator 406 where the user data signal is reconstructed using the error correction codes and the sub code bits are parsed out.

The user data are reconstructed to produce the main channel output signal 408 which is provided to a D/A 410.

The D/A receives the demodulated digital signal and converts the signal into its analog counterpart. The analog output signal 414 is provided to the end user via an appropriate output device 416, such as an audio speaker or a video monitor.

The analog output signal 414 may also be provided to a hidden data extraction module 418. As discussed above, since the hidden message is in the lead-out zone and follows lead-out zone signal requirements, the hidden message, identical with the lead-out zone, is unnoticed by the end user. The extraction module 418 monitors the output signal 414 for a begin synchronization pattern. Once this pattern is found, the hidden message is extracted from output signal 414 and hidden data are decoded. The extraction module then provides then hidden data to a corresponding output device. The extraction and decoding continues until an end synchronization pattern is detected.

In an alternative embodiment to that shown in FIG. 10, the data extraction module 418 is configured to operate upon the digital data of the output signal 408, in which case the input to block 418 is made before, not after, the A/D converter 410.

Figure 11:
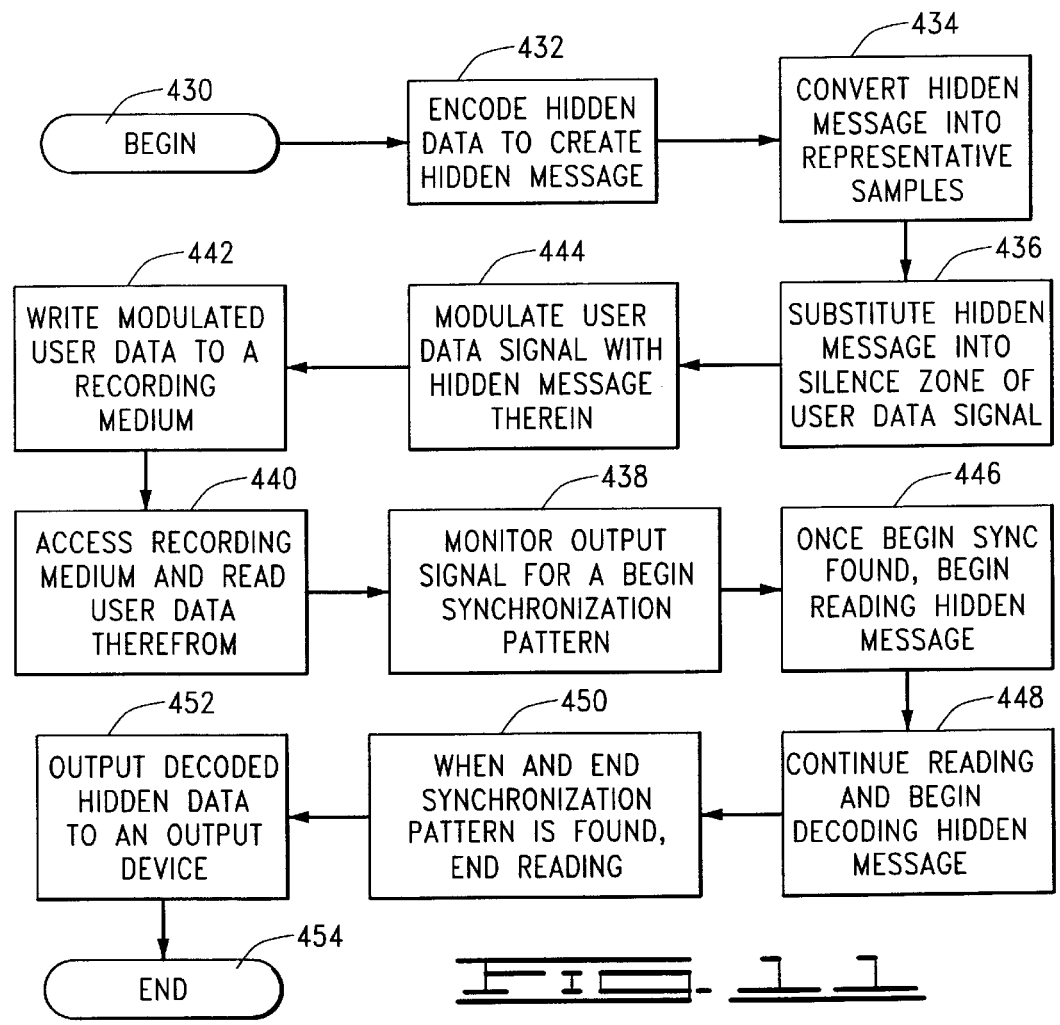
FIG. 11 is flow chart of the steps taken to transfer the hidden data in a silence zone in accordance with the present invention.

FIG. 11 also provides a flowchart of the steps taken to transfer the hidden data in the silence zones of a carrier signal. Steps 430–454 illustrate the process by which a hidden message is placed within the carrier signal without adversely affecting the carrier signal. Furthermore, the steps of FIG. 11 provide for the extraction of the hidden message without compromising the integrity of the carrier signal itself.

The present invention is directed to the placement of hidden data on a carrier signal in an inaudible silence zone. More specifically, the present invention provides for the placement of an encoded hidden message in the lead-in, lead-out, or inter-track zones of an optical disc. The hidden data are encoded using a first digital data sample value, such as "+1" as being equivalent to a binary value, such as "1", and a second digital data sample value, such as "−1" as being equivalent to another binary value, such as "0". The hidden data are encoded into a binary representation and the binary representation is encoded into a digital data sample representation created by multiple first and second digital data sample values. The combination of a digital data sample values are substituted in lieu of the normal inaudible the silence zone data. The user data, having the hidden message written therein, is then encoded onto a recordable medium, such as an optical disc.

When the carrier signal having the user data is read, the hidden message is extracted. An extraction module monitors the normal user data output signal for the begin synchronization pattern, extracts and decodes the hidden data until an end synchronization pattern is found. The hidden data are then provided to an appropriate output device.

Overall, the present invention provides the placement of hidden data written to and extracted from an optical disc in the silence zones of the carrier signal, where the data may be used for copy protection or forensic tracking purposes. Furthermore the hidden data does not interfere with or adversely affect the integrity of the optical disc it is encoded thereon. The hidden message is encapsulated between synchronization patterns for a higher degree of accuracy the detection and decoding of the hidden message and all hidden message data samples written to the silence zone remain inaudible or invisible to the end user but readily detectable by a decoding device.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. An optical disc having a digital carrier signal written therein, the disc comprising:
   a contiguous user data portion comprising a set of user data samples which, when accessed by a readback system, generates a human detectable output, the user data samples stored in a sequence of user data fields of the contiguous user data portion;
   a null zone adjacent the contiguous user data portion comprising a sequence of user data fields storing a set of user data samples which, when accessed by a readback system, generates an output with a specified signal to noise ratio so as to be substantially undetectable by a human, wherein hidden data are written to at least selected ones of the user data fields of the null zone to convey a specified informational message related to the optical disc, the specified informational message undetectable by a human when the null zone is accessed by the readback system.

2. The optical disc of claim 1 where the specified informational message is used for forensic tracking to identify whether the disc is an authorized copy.

3. The optical disc of claim 1 wherein the specified informational message comprises a begin synchronization pattern followed by hidden message data, wherein detection of the begin synchronization pattern facilitates subsequent decoding of the hidden message data.

4. The optical disc of claim 2 wherein the specified informational message comprises an audio signal at a frequency above 20,000 Hertz.

5. The optical disc of claim 1 wherein the specified informational message comprises copy protection information encoded with the hidden message, wherein the copy protection information is accessed and verified before access is granted to remaining portions of the disc.

6. The optical disc of claim 1 wherein the null zone is a lead-in zone at beginning portions of the disc.

7. The optical disc of claim 1 wherein the null zone is a lead-out zone at ending portions of the disc.

8. The optical disc of claim 1 wherein the contiguous user data portion comprises a first audio selection, wherein the optical disc comprises a second audio selection, and wherein the null zone is disposed between the first and second audio selections.

* * * * *